US012585249B2

(12) United States Patent
Kaphengst et al.

(10) Patent No.: US 12,585,249 B2
(45) Date of Patent: Mar. 24, 2026

(54) SYSTEMS AND METHODS FOR MANAGING VEHICLE MANIFEST DATA AT A VEHICLE

(71) Applicant: GM GLOBAL TECHNOLOGY OPERATIONS LLC, Detroit, MI (US)

(72) Inventors: Michael R Kaphengst, Leonard, MI (US); Alfred Manser, White Lake, MI (US); Joshua Lee Solomon, Berkley, MI (US); Seog-Chan Oh, Troy, MI (US); Miguel Arturo Saez, Clarkston, MI (US); Ahmad Almarkhi, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 486 days.

(21) Appl. No.: 18/318,206

(22) Filed: May 16, 2023

(65) Prior Publication Data

US 2024/0385596 A1 Nov. 21, 2024

(51) Int. Cl.
*G05B 19/418* (2006.01)

(52) U.S. Cl.
CPC .................. *G05B 19/41805* (2013.01); *G05B 2219/2637* (2013.01); *G05B 2219/45055* (2013.01)

(58) Field of Classification Search
CPC ...... G05B 19/41805; G05B 2219/2637; G05B 2219/45055
See application file for complete search history.

(56) References Cited

U.S. PATENT DOCUMENTS

| | | | | |
|---|---|---|---|---|
| 10,654,502 B2 * | 5/2020 | Köhler | .................. | B61L 27/40 |
| 10,933,933 B2 | 3/2021 | Wells et al. | | |
| 2011/0270432 A1 * | 11/2011 | Carpenter | ........ | G05B 19/41805 |
| | | | | 700/110 |
| 2012/0185399 A1 * | 7/2012 | Draper | .................. | G06Q 10/08 |
| | | | | 705/303 |
| 2020/0074385 A1 * | 3/2020 | Vangelov | .............. | G07C 5/006 |

(Continued)

OTHER PUBLICATIONS

Kaphengst et al. U.S. Appl. No. 17/931,997. Use of Vehicle Battery to Provide Power to Manufacturing Operations. Filed with the USPTO on Sep. 14, 2022.

*Primary Examiner* — Tameem D Siddiquee
(74) *Attorney, Agent, or Firm* — Ingrassia Fisher & Lorenz, LLP | IF&L

(57) ABSTRACT

Methods and systems are provided for managing vehicle manifest data at a vehicle. Vehicle manifest data is received from a plant operation system at a vehicle manifest data management system of the vehicle. The vehicle manifest data includes a plurality of component identifiers. Each of the component identifiers corresponds to a vehicle component for installation in the vehicle during a vehicle assembly process. The vehicle manifest data includes installation data associated with the installation of each of the vehicle components. A first component identifier associated with a first vehicle component and a first assembly station identifier associated with a first assembly station equipped to install the first vehicle component are received at the vehicle manifest data management system from the plant operation system. The installation data associated with the first vehicle component is transmitted from the vehicle manifest data management system to a station controller of the first assembly station.

20 Claims, 6 Drawing Sheets

(56) References Cited

U.S. PATENT DOCUMENTS

| 2021/0362953 | A1 * | 11/2021 | Schedlbauer | B65G 1/1378 |
| 2021/0397164 | A1 * | 12/2021 | Thomas | G06F 30/15 |
| 2021/0397178 | A1 * | 12/2021 | Thomas | G05D 1/0238 |
| 2022/0318766 | A1 * | 10/2022 | Saito | G06Q 10/20 |
| 2023/0145508 | A1 | 5/2023 | Kaphengst et al. | |

* cited by examiner

SYSTEMS AND METHODS FOR MANAGING VEHICLE MANIFEST DATA AT A VEHICLE

INTRODUCTION

The technical field generally relates to vehicles, and more particularly relates to systems and methods for managing vehicle manifest data at a vehicle.

The assembly of vehicles in a vehicle plant typically involves the installation of a plurality of vehicle components. Different vehicles are often customized to include specific vehicle components. Vehicle plants often include multiple assembly stations where individual assembly stations are equipped to install specific vehicle components. The equipment settings and tool settings at assembly stations have to be modified to accommodate the installation of specific vehicle components. The vehicle components are transported from a vehicle component storage facility at the vehicle plant to the assembly station for installation in the vehicle. Vehicle manifest data for a vehicle defines the vehicle components and the installation data associated with the installation of the vehicle components. A centralized plant operation system typically maintains the vehicle manifest data and coordinates the installation of the vehicle components in individual vehicles. The use of a centralized plant operation system to coordinate the assembly of all of the vehicles in a vehicle plant may introduce errors and inefficiencies into the vehicle assembly process.

In addition, when maintenance procedures are performed on a vehicle, personnel at an auto repair shop may have to parse through manufacturer provided data to identify the specific vehicle components installed in a vehicle and assembly parameters associated with the installation of the vehicle components leading to inefficiencies the potential for errors associated with the maintenance procedures. Furthermore, when a vehicle manufacturer issues a component recall, auto repair shop personnel may have to identify the specific vehicle components associated with the component recall and check the model numbers and serial numbers of the identified vehicle components to determine if the component recall is applicable to the vehicle components installed in a vehicle introducing the potential for errors.

Accordingly, it is desirable to provide improved methods and systems to manage vehicle manifest data at a vehicle. Other desirable features and characteristics will become apparent from the subsequent detailed description and the appended claims, taken in conjunction with the accompanying drawings and the foregoing technical field and background.

SUMMARY

In various embodiments, a vehicle manifest data management system of a vehicle includes at least one processor and at least one memory communicatively coupled to the at least one processor. The at least one memory includes instructions that upon execution by the at least one processor, cause the at least one processor to receive vehicle manifest data for the vehicle from a plant operation system. The vehicle manifest data includes a plurality of component identifiers, each of the plurality of component identifiers corresponding to one of a plurality of vehicle components for installation in the vehicle during a vehicle assembly process, and installation data associated with the installation of each of the plurality of vehicle components in the vehicle during the vehicle assembly process. The at least one memory includes further instructions that upon execution by the at least one processor, cause the at least one processor to receive a first component identifier associated with a first vehicle component and a first assembly station identifier associated with a first assembly station equipped to install the first vehicle component from the plant operation system, the first component identifier being one of the plurality of component identifiers; and transmit the installation data associated with the first vehicle component to a station controller of the first assembly station.

In various embodiments, the at least one memory includes further instructions that upon execution by the at least one processor, cause the at least one processor to transmit the installation data associated with the first vehicle component to the station controller, the installation data comprising at least one of first vehicle component tool settings, first vehicle component equipment settings, and first vehicle component installation instructions.

In various embodiments, the at least one memory includes further instructions that upon execution by the at least one processor, cause the at least one processor to: receive at least one of a component model number and a component serial number associated with the first vehicle component from the station controller; and store the received at least one of the component model number and the component serial number in the at least one memory.

In various embodiments, the at least one memory includes further instructions that upon execution by the at least one processor, cause the at least one processor to receive the first component identifier associated with the first vehicle component from the plant operation system, wherein the selection of the first vehicle component from the plurality of vehicle components by the plant operation system is based at least in part on an assembly order of the plurality of vehicle components.

In various embodiments, the at least one memory includes further instructions that upon execution by the at least one processor, cause the at least one processor to receive the first assembly station identifier associated with the first assembly station from the plant operation system, wherein the selection of the first assembly station from a plurality of assembly stations at a vehicle plant by the plant operation system is based at least in part on station availability data associated with each of the plurality of assembly stations.

In various embodiments, the at least one memory includes further instructions that upon execution by the at least one processor, cause the at least one processor to: receive a route to the first assembly station and a desired arrival time at the first assembly station from the plant operation system; calculate a speed of the vehicle based on the route and the desired arrival time; and issue instructions to an automatic driving system (ADS) of the vehicle to drive the vehicle to the first assembly station via the received route at the calculated vehicle speed.

In various embodiments, the at least one memory includes further instructions that upon execution by the at least one processor, cause the at least one processor to transmit a component delivery request to the plant operation system to deliver the first vehicle component to the first assembly station.

In various embodiments, the at least one memory includes further instructions that upon execution by the at least one processor, cause the at least one processor to: transmit a component delivery request to the plant operation system to deliver the first vehicle component to a component pick-up location at the vehicle plant; issue instructions to an ADS of the vehicle to drive the vehicle to the component pick-up location to enable the loading of the first vehicle component into the vehicle; and issue instructions to the ADS to drive the vehicle from the component pick-up location to the first assembly station.

In various embodiments, the at least one memory includes further instructions that upon execution by the at least one processor, cause the at least one processor to: transmit an appointment request associated with a maintenance procedure to an auto repair shop system; and receive an appointment for the maintenance procedure from the auto repair shop system.

In various embodiments, the at least one memory includes further instructions that upon execution by the at least one processor, cause the at least one processor to: transmit a component model number and a component serial number associated with at least some of the vehicle components from the plurality of vehicle components associated with the maintenance procedure to the auto repair shop system; receive an updated component model number and an updated component serial number associated with at least some of the replaced vehicle components from the auto repair shop system; and store the updated component model number and the updated component serial number in the at least one memory.

In various embodiments, the at least one memory includes further instructions that upon execution by the at least one processor, cause the at least one processor to: receive a component recall associated with the first vehicle component from an auto manufacturer system, the component recall being based on at least one of a component model number and a component serial number of the first vehicle component; transmit an appointment request associated with the component recall to an auto repair shop system; and receive an appointment to implement a component recall procedure from the auto repair shop system.

In various embodiments, a method for managing vehicle manifest data of a vehicle includes receiving vehicle manifest data for the vehicle from a plant operation system at a vehicle manifest data management system of the vehicle. The vehicle manifest data includes a plurality of component identifiers and installation data. Each of the plurality of component identifiers corresponds to one of a plurality of vehicle components for installation in the vehicle during a vehicle assembly process. The installation data is associated with the installation of each of the plurality of vehicle components in the vehicle during the vehicle assembly process. The method further includes receiving a first component identifier associated with a first vehicle component and a first assembly station identifier associated with a first assembly station equipped to install the first vehicle component from the plant operation system at the vehicle manifest data management system, the first component identifier being one of the plurality of component identifiers; and transmitting the installation data associated with the first vehicle component from the vehicle manifest data management system to a station controller of the first assembly station.

In various embodiments, the method further includes transmitting the installation data associated with the first vehicle component from the vehicle manifest data management system to the station controller. The installation data includes at least one of first vehicle component tool settings, first vehicle component equipment settings, and first vehicle component installation instructions.

In various embodiments, the method further includes receiving at least one of a component model number and a component serial number associated with the first vehicle component from the station controller at the vehicle manifest data management system; and storing the received at least one of the component model number and the component serial number at the vehicle manifest data management system.

In various embodiments, the method further includes receiving a route to the first assembly station and a desired arrival time at the first assembly station from the plant operation system at the vehicle manifest data management system; calculating a speed of the vehicle based on the route and the desired arrival time at the vehicle manifest data management system; and issuing instructions from the vehicle manifest data management system to an automatic driving system (ADS) of the vehicle to drive the vehicle to the first assembly station via the received route at the calculated vehicle speed.

In various embodiments, the method further includes transmitting a component delivery request from the vehicle manifest data management system to the plant operation system to deliver the first vehicle component to the first assembly station.

In various embodiments, the method further includes: transmitting a component delivery request from the vehicle manifest data management system to the plant operation system to deliver the first vehicle component to a component pick-up location at the vehicle plant; issuing instructions from the vehicle manifest data management system to an ADS of the vehicle to drive the vehicle to the component pick-up location to enable the loading of the first vehicle component into the vehicle; and issuing instructions from the vehicle manifest data management system to the ADS to drive the vehicle from the component pick-up location to the first assembly station.

In various embodiments, the method further includes: transmitting an appointment request associated with a maintenance procedure from the vehicle manifest data management system to an auto repair shop system; and receiving an appointment for the maintenance procedure from the auto repair shop system at the vehicle manifest data management system.

In various embodiments, the method further includes transmitting a component model number and a component serial number associated with at least some of the vehicle components from the plurality of vehicle components associated with the maintenance procedure from the vehicle manifest data management system to the auto repair shop system; receiving an updated component model number and an updated component serial number associated with at least some of the replaced vehicle components from the auto repair shop system at the vehicle manifest data management system; and storing the updated component model number and the updated component serial number at the vehicle manifest data management system.

In various embodiments, a vehicle includes a vehicle manifest data management system. The vehicle manifest data management system includes at least one processor and at least one memory communicatively coupled to the at least one processor. The at least one memory includes instructions that upon execution by the at least one processor, cause the at least one processor to: receive vehicle manifest data for the vehicle from a plant operation system. The vehicle manifest data includes a plurality of component identifiers, each of the plurality of component identifiers corresponding to one of a plurality of vehicle components for installation in the vehicle during a vehicle assembly process; and installation data associated with the installation of each of the plurality of vehicle components in the vehicle during the vehicle assembly process. The at least one memory further includes instructions that upon execution by the at least one processor, cause the at least one processor to: receive a first component identifier associated with a first vehicle component and a first assembly station identifier associated with a first assembly station equipped to install the first vehicle component from the plant operation system, the first component identifier being one of the plurality of component identifiers; and transmit the installation data associated with the first vehicle component to a station controller of the first assembly station.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
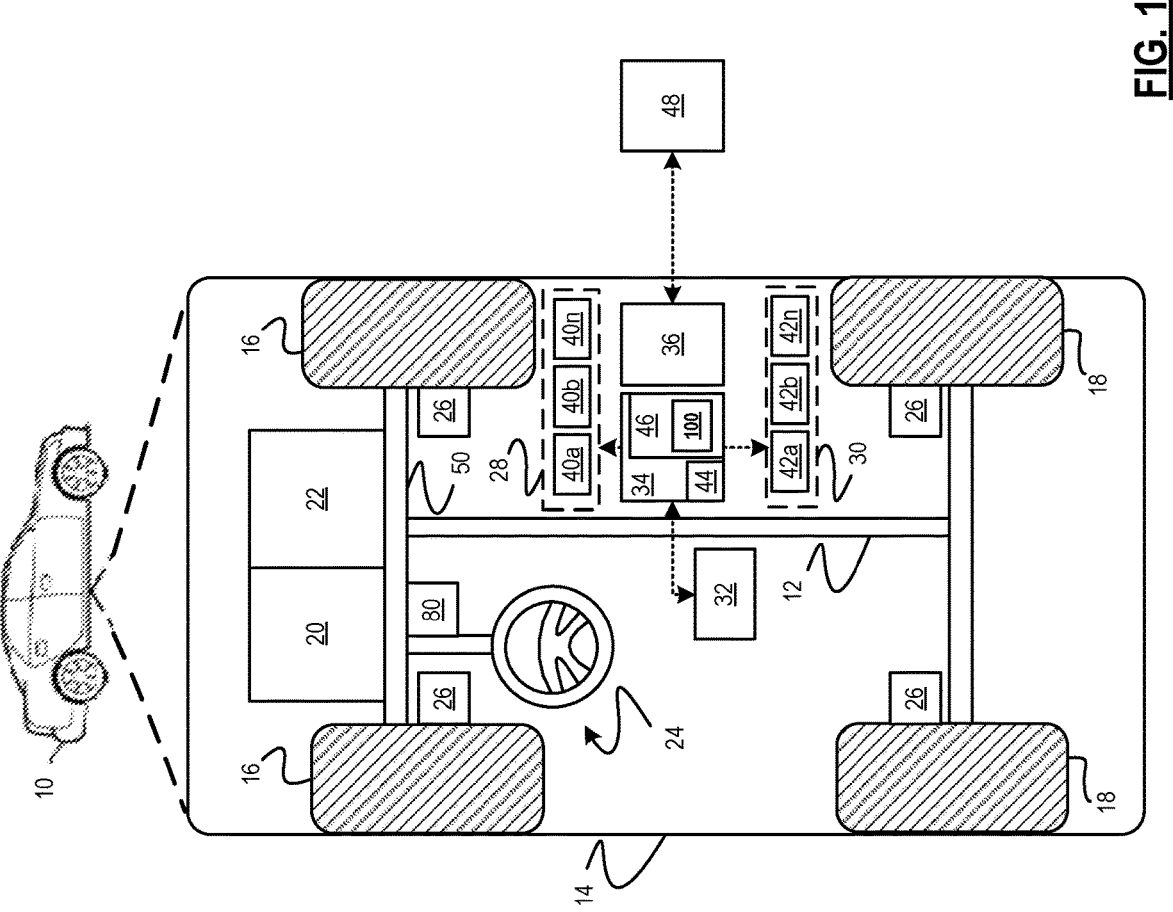
FIG. 1 is a functional block diagram of a vehicle including a vehicle manifest data management system in accordance with at least one embodiment.

Referring to FIG. 1, a functional block diagram of a vehicle 10 including a vehicle manifest data management system 100 in accordance with at least one embodiment is shown. The vehicle 10 generally includes a chassis 12, a body 14, front wheels 16, and rear wheels 18. The vehicle 10 is depicted in the illustrated embodiment as a passenger car, but it should be appreciated that the vehicle manifest data management system 100 may be included within any other vehicle including trucks, sport utility vehicles (SUVs), recreational vehicles (RVs), etc., can also be used.

In various embodiments, the body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous or semi-autonomous vehicle that is automatically controlled to carry passengers and/or cargo from one place to another. For example, in an exemplary embodiment, the vehicle 10 is a so-called Level Two, Level Three, Level Four or Level Five automation system. Level two automation means the vehicle assists the driver in various driving tasks with driver supervision. Level three automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20 a transmission system 22, a steering system 24, a braking system 26, a sensor system 28, an actuator system 30, at least one data storage device 32, at least one controller 34, and a communication system 36. The controller 34 is configured to implement an automated driving system (ADS). The propulsion system 20 is configured to generate power to propel the vehicle. The propulsion system 20 may, in various embodiments, include an internal combustion engine, an electric machine such as a traction motor, a fuel cell propulsion system, and/or any other type of propulsion configuration. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The braking system 26 is configured to provide braking torque to the vehicle wheels 16-18. The braking system 26 may, in various embodiments, include friction brakes, brake by wire, a regenerative braking system such as an electric machine, and/or other appropriate braking systems.

The steering system 24 is configured to influence a position of the of the vehicle wheels 16. While depicted as including a steering wheel and steering column, for illustrative purposes, in some embodiments contemplated within the scope of the present disclosure, the steering system 24 may not include a steering wheel and/or steering column. The steering system 24 includes a steering column coupled to an axle 50 associated with the front wheels 16 through, for example, a rack and pinion or other mechanism (not shown). Alternatively, the steering system 24 may include a steer by wire system that includes actuators associated with each of the front wheels 16.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors.

The vehicle dynamics sensors provide vehicle dynamics data including longitudinal speed, yaw rate, lateral acceleration, longitudinal acceleration, etc. The vehicle dynamics sensors may include wheel sensors that measure information pertaining to one or more wheels of the vehicle 10. In one embodiment, the wheel sensors comprise wheel speed sensors that are coupled to each of the wheels 16-18 of the vehicle 10. Further, the vehicle dynamics sensors may include one or more accelerometers (provided as part of an Inertial Measurement Unit (IMU)) that measure information pertaining to an acceleration of the vehicle 10. In various embodiments, the accelerometers measure one or more acceleration values for the vehicle 10, including latitudinal and longitudinal acceleration and yaw rate.

The actuator system 30 includes one or more actuator devices 42a-42n that control one or more vehicle features such as, but not limited to, the propulsion system 20, the transmission system 22, the steering system 24, and the braking system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in the ADS of the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, the controller(s) 34 are configured to implement ADS.

Figure 2:
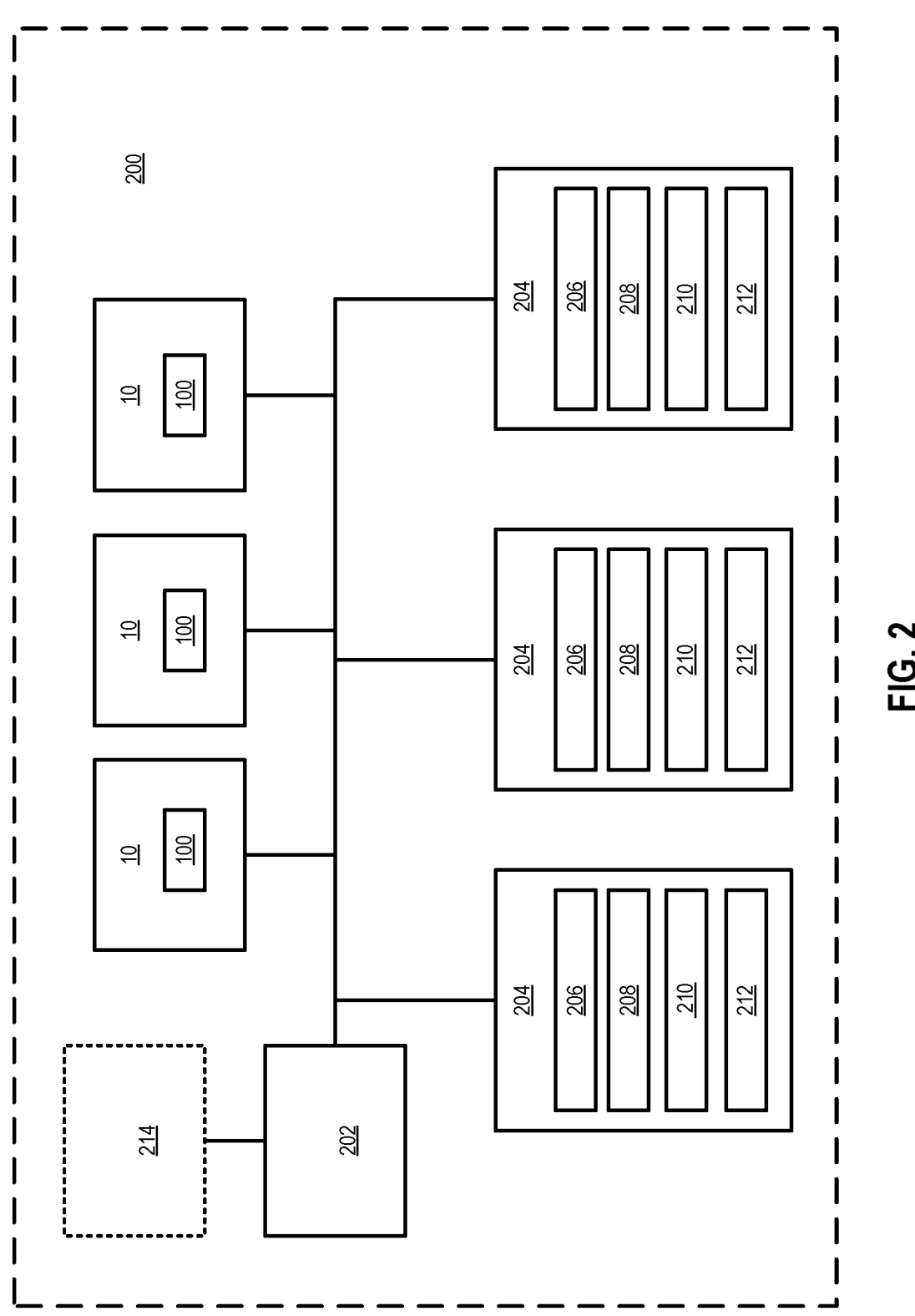
FIG. 2 is a functional block diagram of a vehicle plant illustrating vehicles including vehicle manifest data management systems and under assembly in accordance with at least one embodiment.

Referring to FIG. 2, a functional block diagram of a vehicle plant 200 illustrating vehicles 10 including vehicle manifest data management systems 100 and under assembly in accordance with at least one embodiment is shown. Each vehicle 10 includes a vehicle manifest data management system 100. Each vehicle manifest data management system 100 is configured to facilitate assembly of the associated vehicle 10 at the vehicle plant 200.

The vehicle plant 200 includes a plant operation system 202 and a plurality of assembly stations 204. Each assembly station 204 includes at least one station controller 206, equipment 208, tool(s) 210, and display device(s) 212 to facilitate installation of one or more vehicle components in vehicles 10. While the vehicle plant 200 is shown as including three different assembly stations 204, a vehicle plant 200 may include a fewer or greater number of assembly stations 204.

A plurality of different vehicles 10 may be undergoing assembly at the vehicle plant 200 at the same time. Different vehicles 10 may be undergoing the installation of different vehicle components at different assembly stations 204 at the same time. Each of the vehicles 10 may be at a different point in the vehicle assembly process. While three vehicles 10 are shown as undergoing assembly at the vehicle plant 200, a fewer or greater number of vehicles 10 may be undergoing assembly at the vehicle plant 200 at the same time. While a single centralized plant operation system 202 is shown, a vehicle plant 200 may include a greater number of distributed plant operation systems that cooperate to facilitate the assembly of vehicles 10 at the vehicle plant 200.

Each vehicle 10 includes a vehicle manifest data management system 100. Each vehicle manifest data management system 100 is configured to be communicatively coupled to the plant operation system 202. In various embodiments, the vehicle manifest data management system 100 is configured to be communicatively coupled to the plant operation system 202 via a wireless communication system. Each vehicle manifest data management system 100 is configured to receive vehicle manifest data from the plant operation system 202 that is specific to the associated vehicle 10. In various embodiments, the vehicle manifest data management system 100 is configured to receive vehicle manifest data from the plant operation system 202 that is specific to a vehicle 10 prior to the installation of the vehicle manifest data management system 100 in that vehicle 10. The vehicle manifest data includes a plurality of components identifiers. Each of the component identifiers corresponds to one of a plurality of vehicle components for installation in a vehicle 10 during the vehicle assembly process. The vehicle manifest data associated with a vehicle 10 includes installation data associated with the installation of each of the plurality of vehicle components in the vehicle 10.

The plant operation system 202 is configured to coordinate the assembly of the vehicles 10 at the vehicle plant 200. The plant operation system 202 is configured to provide the vehicle manifest data management system 100 of each vehicle 10 with a component identifier and an assembly station identifier associated with the next vehicle component designated for installation in that vehicle 10. The component identifier identifies the next vehicle component. In various embodiments, the plant operation system 202 is configured in select the next vehicle component for installation in a vehicle 10 in accordance with an assembly order. The assembly station identifier identifies the assembly station 204 that is equipped the install the vehicle component and is available to perform the installation.

In various embodiments, the plant operation system 202 is configured to coordinate the routing of each vehicle 10 to the appropriate assembly station 204 for the installation of the vehicle component. Upon arrival at the assembly station 204, the vehicle manifest data management system 100 of the vehicle 10 is configured to transmit the installation data associated with the installation of the vehicle component to the station controller 206 of the assembly station 204. Examples of installation data include, but are not limited to, vehicle component tool settings for the tool(s) 210, vehicle component equipment settings for the equipment 208, and vehicle component installation instructions for display on a display device(s) 212. In various embodiments, the vehicle manifest data management system 100 may be configured to transmit the installation data directly to the equipment 208, the tool(s) 210, and/or the display device(s) 212 at the assembly station 204.

The vehicle plant 200 may include a component pick-up location 214. Interactions between a vehicle manifest data management system 100 with respect to the component pick-up location will be described in greater detail below. The vehicle manifest data management system 100 of each vehicle 10 may be configured to be communicatively coupled to the vehicle manifest data management system 100 of other vehicles 10 that are undergoing assembly at the vehicle plant 200. While one configuration of a vehicle plant 200 has been described, the vehicle plant 200 may include additional facilities and/or components that facilitate the assembly of vehicles 10.

Figure 3:
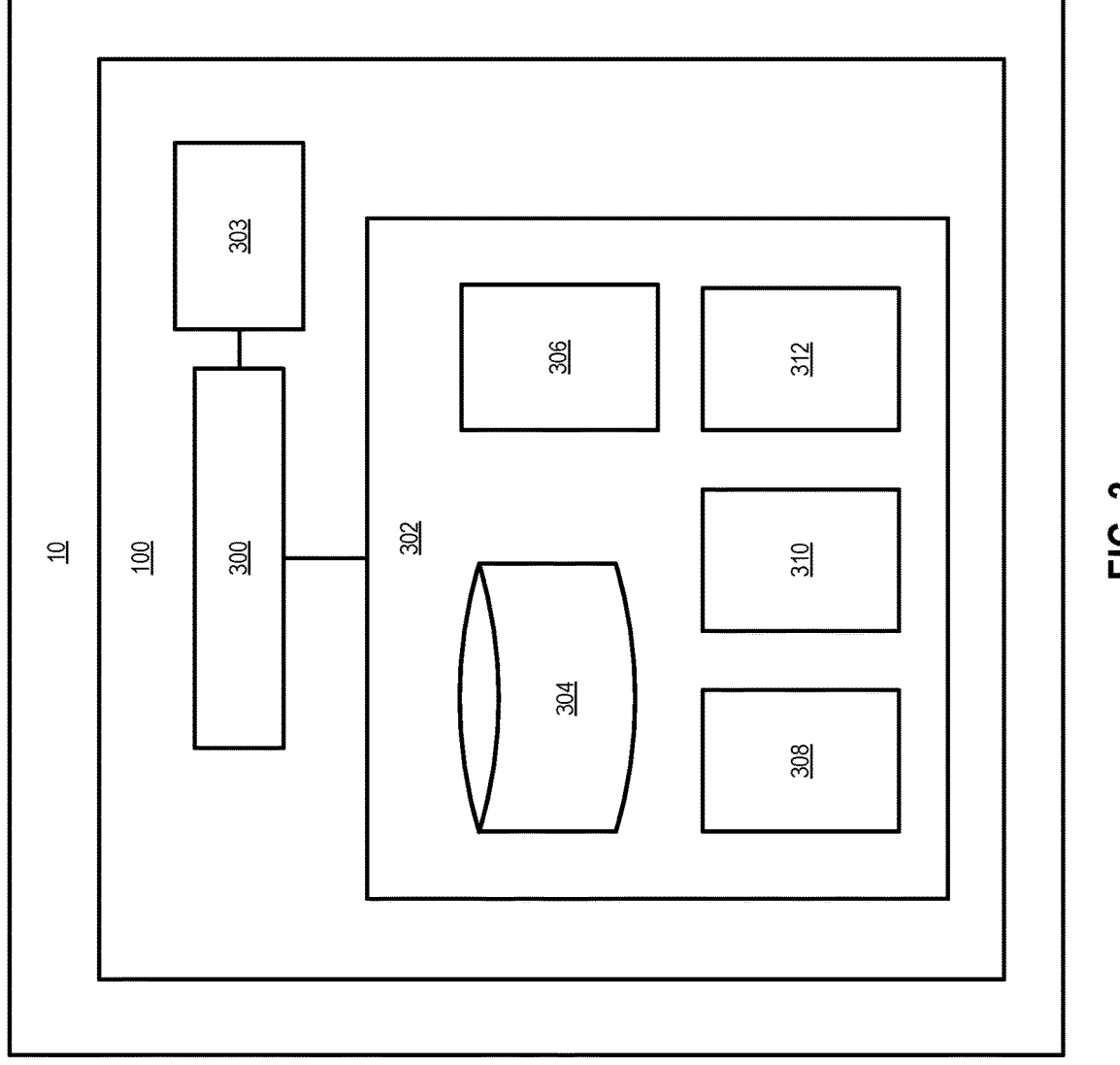
FIG. 3 is a functional block diagram of a vehicle manifest data management system in accordance with at least one embodiment.

Referring to FIG. 3, a functional block diagram of a vehicle manifest data management system 100 in accordance with at least one embodiment is shown. In various embodiments, the vehicle manifest data management system 100 is a controller 34. The vehicle manifest data management system 100 includes at least one processor 300, at least one memory 302, and a communication system 303. The processor(s) 300 is communicatively coupled to the at least one memory 302 and the communication system 303. The processor(s) 300 is a programable device that includes one or more instructions stored in or associated with the at least one memory 302. The at least one memory 302 includes instructions that the processor(s) 300 is configured to execute. The at least one memory 302 includes a manifest data database 304, a component delivery coordinator 306, an assembly station route manager 308, an assembly station data manager 310, and vehicle maintenance manager 312. The communication system 303 is configured to facilitate communications between the vehicle manifest data management system 100 and one or more of the plant operation systems 202, the assembly stations 204 and the other vehicles 10 under assembly at the vehicle plant 200. The vehicle manifest data management system 100 may include additional components that facilitate operation of the vehicle manifest data management system 100. The operation of the vehicle manifest management system 100 will be described in greater detail below.

Figure 4:
FIG. 4 is a flowchart representation of an exemplary method of managing vehicle manifest data of a vehicle during a vehicle assembly process at a vehicle plant in accordance with at least one embodiment.
Figure 4:
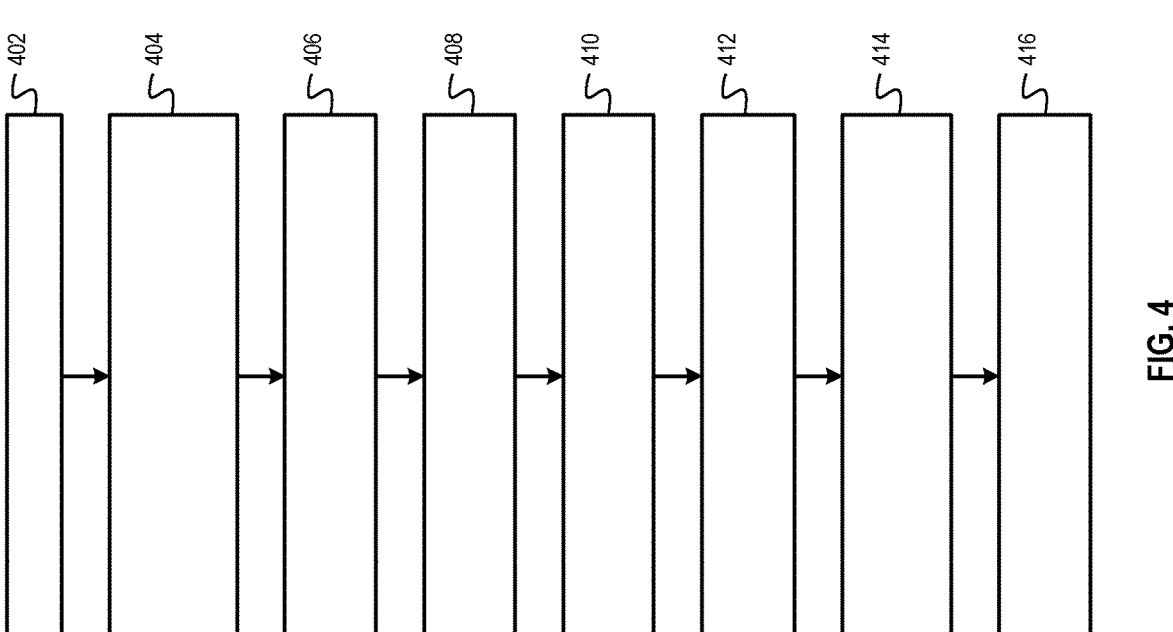

Referring to FIG. 4, a flowchart representation of an exemplary method 400 of managing vehicle manifest data of a vehicle 10 during a vehicle assembly process at a vehicle plant 200 in accordance with at least one embodiment is shown. The method 400 will be described with reference to an exemplary implementation of the vehicle manifest data management system 100. As can be appreciated in light of the disclosure, the order of operation within the method 400 is not limited to the sequential execution as illustrated in FIG. 4 but may be performed in one or more varying orders as applicable and in accordance with the present disclosure.

At 402, the vehicle manifest data management system 100 receives the vehicle manifest data for the vehicle 10. In various embodiments, the vehicle manifest data management system 100 is configured to receive the vehicle manifest data from the plant operation system 202. The vehicle manifest data management system 100 is configured to be associated with a specific vehicle 10. The received vehicle manifest data is specific to the assembly of the associated vehicle 10. The vehicle manifest data management system 100 is configured to store the received vehicle manifest data in the manifest data database 304. In various embodiments, the vehicle manifest data management system 100 is configured to receive the vehicle manifest data from the plant operation system 202 prior to installation of the vehicle manifest data management system 100 in the vehicle 10.

The vehicle manifest data for the vehicle 10 includes a plurality of component identifiers associated with the vehicle components that will be installed in the vehicle 10 during the vehicle assembly process and the installation data associated with the installation of each of the plurality of vehicle components. The installation data associated with the installation of a vehicle component includes one or more of vehicle component tool setting(s), vehicle component equipment setting(s), and vehicle component installation instructions. The installation data for a vehicle component may include fastener requirements, trace requirements, torque requirements, and fail-safe protocols associated with the installation of that vehicle component. In various embodiments, one or more of the vehicle components may be individual vehicle components. In various embodiments, one or more of the vehicle components may be component kits that include a vehicle component and other parts associated with installation of that vehicle component.

At 404, the vehicle manifest data management system 100 receives a component identifier and a station identifier associated with an assembly station 204 that is equipped to install the vehicle component associated with the received component identifier in the vehicle 10. In various embodiments, the vehicle manifest data management system 100 is configured to receive the component identifier and the station identifier from the plant operation system 202.

With continued reference to 404 and/or other steps of the method 400, the plant operation system 202 is configured to maintain the vehicle manifest data for each of the vehicles 10 undergoing assembly at the vehicle plant 200. The plant operation system 202 is configured to select the vehicle component from the vehicle components designated for installation in the vehicle 10. In various embodiments, the vehicle components are installed in the vehicle 10 in accordance with an assembly order. The plant operation system 202 is configured to select the next vehicle component for installation in the vehicle 10 based on the assembly order of the vehicle components for that vehicle 10. The plant operation system 202 is configured to transmit the component identifier associated with the selected vehicle component to the vehicle manifest data management system 100. The selection of the next vehicle component for installation based on assembly order may also be referred to as a next precedence-based operation.

In some cases, two or more vehicle components designated for installation in the vehicle 10 may have the same position in the assembly order. In at least one embodiment, the plant operation system 202 is configured to identify a set of vehicle components from the plurality of vehicle components that are designated for installation in the vehicle 10 that have the same position in the assembly order and are next in line for installation.

The vehicle plant 200 includes a plurality of assembly stations 204. Each assembly station 204 is equipped to install a specific vehicle component in a vehicle 10. In some instances, multiple assembly stations 204 may be equipped to install the same vehicle component. The plant operation system 202 is configured to receive station availability data from each of the assembly stations 204 at the vehicle plant 200. The station availability data for an assembly station 204 may indicate whether that assembly station 204 is available to install a vehicle component. The station availability data for an assembly station 204 may indicate a length of a queue of vehicles 10 awaiting installation of a vehicle component at that assembly station 204. In various embodiments, the plant operation system 202 is configured to receive station availability data about an assembly station 204 from another vehicle 10 undergoing an installation of a vehicle component at that assembly station 204.

The plant operation system 202 is configured to identify the assembly stations 204 that are equipped to install the vehicle components in the set of vehicle components designated for installation in the vehicle 10 that have the same position in the assembly order and are next in line for installation. The plant operation system 202 is configured to select an assembly station 204 from the identified assembly stations 204 based on the associated station availability data. The plant operation system 202 identifies the vehicle component from the set of vehicle components associated with the selected assembly station 204 as the next vehicle component designated for installation in the vehicle 10. The selection of the next vehicle component for installation in the vehicle 10 based on the assembly order of the vehicle components and on station availability data may minimize waiting times associated with the installation of the vehicle components during the assembly of vehicles 10 at the vehicle plant 200. The plant operation system 202 transmits the component identifier associated with the next vehicle component designated for installation and the station identifier associated with the assembly station 204 selected to install the next vehicle component to the vehicle manifest data management system 100.

In various embodiments, the vehicle manifest data management system 100 of each vehicle 10 is configured to be communicatively coupled to the vehicle manifest data management systems 100 of other vehicles 10 under assembly at the vehicle plant 200. The vehicle manifest data management system 100 of a vehicle 10 is configured to receive station availability data from the vehicle manifest data management systems 100 of the other vehicles 10. The vehicle manifest data management system 100 of the vehicle 10 is configured to receive a component identifier from the plant operation system 202 and select an assembly station 204 to install the vehicle component associated with the received component identifier based on the received station availability data.

At 406, the component delivery coordinator 306 of the vehicle manifest data management system 100 transmits a component delivery request for the vehicle component designated as the next vehicle component for installation in the vehicle 10. In at least one embodiment, the component delivery coordinator 306 is configured to transmit a component delivery request for the vehicle component to the plant operation system 202 to deliver the vehicle component to the assembly station 204 associated with the received station identifier.

In various embodiments, the component delivery coordinator 306 is configured to transmit a component delivery request for the vehicle component to the plant operation system 202 to deliver the vehicle component to the component pick-up location 214 at the vehicle plant 200. The component delivery coordinator 306 is configured to issue instructions to the ADS of the vehicle 10 to drive the vehicle 10 to the component pick-up location 214 to enable loading of the vehicle component into the vehicle 10 at the component pick-up location 214. Following the loading of the vehicle component into the vehicle 10, the component delivery coordinator 306 is configured to issue instructions to the ADS of the vehicle 10 to drive the vehicle 10 to the assembly station 204 associated with the received station identifier.

At 408, the assembly station route manager 308 of the vehicle manifest data management system 100 receives a route to the assembly station 204 associated with the received station identifier and a desired arrival time at the assembly station 204. In at least one embodiment, the assembly station route manager 308 is configured to receives a route to the assembly station 204 associated with the received station identifier and a desired arrival time at the assembly station 204 from the plant operation system 202. The route provided by the plant operation system 202 may be an optimal route based at least in part on traffic on the vehicle plant floor.

At 410, the assembly station route manager 308 coordinates driving of the vehicle 10 to the assembly station 204 at a speed of the vehicle 10 based on the route and the desired arrival time. The assembly station route manager 308 is configured to receive the route to the assembly station and the desired arrival time. The assembly station route manager 308 is configured to calculate a speed of the vehicle 10 based on the received route and the desired arrival time. The assembly station route manager 308 is configured to issue instructions to the ADS of the vehicle 10 to drive the vehicle 10 to the assembly station 204 via the received route at the calculated speed.

In various embodiments, if an issue associated with the route to the assembly station 204 arises as the vehicle 10 is enroute to the assembly station 204, the assembly station route manager 308 receives an updated route to the assembly station 204 and an updated desired arrival time. The assembly station route manager 308 coordinates the driving of the vehicle 10 to the assembly station 204 at an updated speed of the vehicle 10 based on the updated route and the updated desired arrival time.

In various embodiments, if an issue associated with the installation of the vehicle component arises as the vehicle 10 is enroute to the assembly station 204, the method returns to 404 and the vehicle manifest data management system 100 receives another component identifier associated with another vehicle component and a station identifier associated with an assembly station 204 that is equipped to install the vehicle component.

At 412, the assembly station data manager 310 of the vehicle manifest data management system 100 is configured to receive the component model number and the component serial number of the specific vehicle component received for installation at the assembly station 204. In various embodiments, the assembly station data manager 310 is configured to receive the component model number and the component serial number from the station controller 206. In various embodiments, the assembly station data manager 310 is configured to receive the component model number and the component serial number from the station controller 206 prior to installation of the vehicle component in the vehicle 10. In at least one embodiment, the assembly station data manager 310 is configured to receive the component model number and the component serial number at the component pick-up location 214 when the vehicle 10 picks up the vehicle component. The assembly station data manager 310 is configured to store the receive component model number and component serial number in the manifest data database 304. In various embodiments, the vehicle component is scanned for correct component usage and traceability and the scanned data received at the vehicle manifest data management system 100 for storage in the manifest data database 304.

At 414, the assembly station data manager 310 is configured to transmit the installation data associated with the vehicle component to be installed in the vehicle 10 to the station controller 206 of the assembly station 204. Each assembly station 204 includes one or more of equipment 208, tool(s) 210, and display device(s). In various embodiments, the installation data for each vehicle component includes one or more of vehicle component tool setting(s), vehicle component equipment setting(s), and vehicle component installation instruction(s) associated with that vehicle component. In various embodiments, the assembly station data manager 310 is configured to transmit the vehicle component equipment setting(s) directly to the equipment 208 and the vehicle component tool setting(s) directly to the tool(s). The equipment 208 is configured to adjust the equipment setting(s) in accordance with the received vehicle component equipment setting(s) and the tool(s) 210 is configured to adjust tool(s) setting(s) in accordance with the received vehicle component tool setting(s) in preparation for the installation of the vehicle component.

At 416, the assembly station data manager 310 is configured to receive confirmation that the vehicle component has been installed in the vehicle 10. In various embodiments, the assembly station data manager 310 is configured to receive validation of torque data and the validated torque data is stored in the manifest data database 304. The method 400 then returns to 404 and the vehicle manifest data management system 100 receives the component identifier associated with the next vehicle component designated for installation in the vehicle 10 and the station identifier associated with the assembly station 204 selected to perform the installation from the plant operation system 202.

In various embodiments, if an error is detected with respect to the vehicle component or during the validation and testing process associated with the vehicle component at the assembly station 204, vehicle manifest data management system 100 is configured to initiate a repair call with the plant operation system 202 for repair materials to be sent to the assembly station 204.

Figure 5:
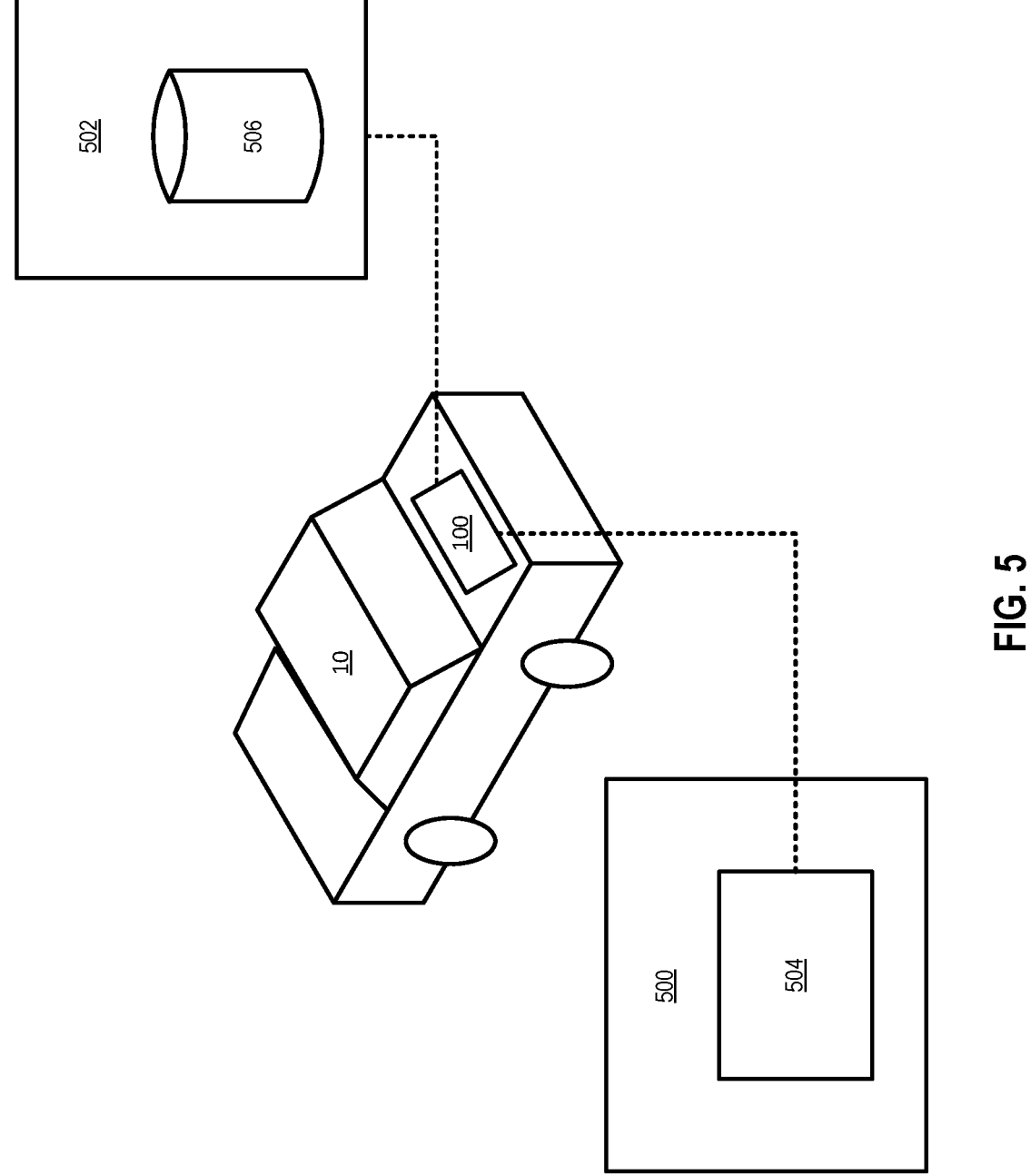
FIG. 5 is a functional block diagram of a vehicle including a vehicle manifest data management system configured to be communicatively coupled to an auto repair shop 500 and an auto manufacturer system 502 in accordance with at least one embodiment.

Referring to FIG. 5, a functional block diagram of a vehicle 10 including a vehicle manifest data management system 100 configured to be communicatively coupled to an auto repair shop 500 and an auto manufacturer system 502 in accordance with at least one embodiment is shown. In various embodiments, the vehicle manifest data management system 100 is configured to facilitate the implementation of maintenance procedures associated with the vehicle 10 at auto repair shops 500.

The auto repair shop 500 includes an auto repair shop system 504. The vehicle manifest data management system 100 configured to be communicatively coupled to the auto repair shop 500 via the auto repair shop system 504. The auto repair shop 500 is equipped to perform maintenance procedures on vehicles 10. While a single auto repair shop is shown, the vehicle manifest data management system 100 may be configured to be communicatively coupled to multiple different auto repair shops 500.

The auto manufacturer system 502 maintains a vehicle database 506. The auto manufacturer system 502 stores the list of vehicle components installed in individual vehicles 10 manufactured by the auto manufacturer as well as the component model number and the component serial number for each of the vehicle components installed in individual vehicles 10 in the vehicle database 506. The auto manufacturer system 502 tracks component recalls issued by the auto manufacturer for vehicle components installed in vehicles 10 manufactured by the auto manufacturer. The auto repair shop 500 is equipped to perform component recall procedures associated with component recalls associated with different vehicle components on vehicles 10. Interactions between the vehicle manifest data management systems 100 with the auto repair shop 500 and the auto manufacturer system 502 will be described in greater detail below.

Figure 6:
FIG. 6 is a flowchart representation of a method of managing vehicle manifest data with respect to an auto repair shop in accordance with at least one embodiment.
Figure 6:
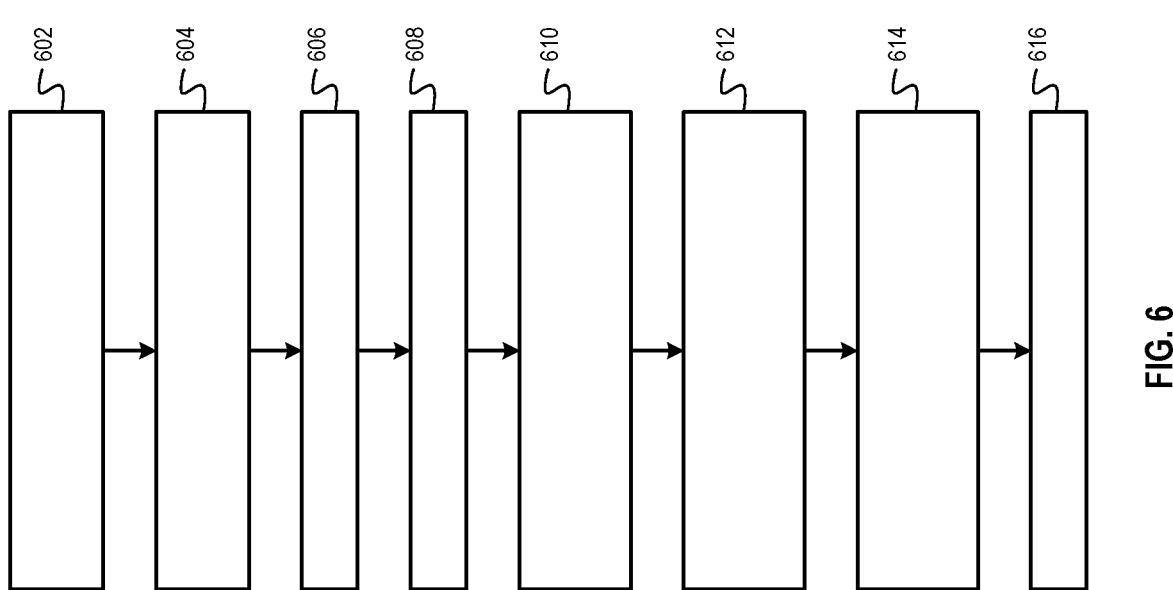

FIG. 6 is a flowchart representation of a method 600 of managing vehicle manifest data with respect to an auto repair shop 500 in accordance with at least one embodiment. The method 600 will be described with reference to an exemplary implementation of the vehicle manifest data management system 100. As can be appreciated in light of the disclosure, the order of operation within the method 600 is not limited to the sequential execution as illustrated in FIG. 6 but may be performed in one or more varying orders as applicable and in accordance with the present disclosure.

At 602, the vehicle maintenance manager 312 of the vehicle manifest data management system 100 transmits an appointment request to the auto repair shop system 504 of the auto repair shop 500. In various embodiments, the vehicle maintenance manager 312 transmits an appointment request associated with a maintenance procedure to the auto repair shop system 504.

The auto manufacturer system 502 is configured to store the list of vehicle components installed in individual vehicles 10 manufactured by the auto manufacturer as well as the component model number and the component serial number for each of the vehicle components installed in individual vehicles 10 in the vehicle database 506. The auto manufacturer system 502 is configured to track component recalls associated with vehicle components issued by the auto manufacturer. In many instances a component recall issued by an auto manufacturer specifies a component model number associated with a vehicle component and the component serial numbers of the vehicle component involved in the component recall. For example, the auto manufacturer may issue a component recall for airbags that have a specific component model number and have specific component serial numbers. The auto manufacturer system 502 is configured to receive the component model number and component serial numbers indicating the specific vehicle components being recalled from the auto manufacturer.

The auto manufacturer system 502 is configured to access the vehicle database 506 to identify the vehicles 10 installed with vehicle components having the component model number and component serial numbers specified in a component recall. The auto manufacturer system 502 is configured to transmit the component recall associated with the recalled vehicle component to the vehicle manifest data management system 100 of the identified vehicles 10. In various embodiments, the vehicle maintenance manager 312 receives the component recall associated with the vehicle component and transmits an appointment request associated with a component recall procedure to the auto repair shop system 504.

At 604, the vehicle maintenance manager 312 receives an appointment from the auto repair shop system 504. In at least one embodiment, the vehicle maintenance manager 312 receives an appointment for a maintenance procedure from the auto repair shop system 504 in response to the transmission of an appointment request for a maintenance procedure.

In at least one embodiment, the vehicle maintenance manager 312 receives an appointment for a component recall procedure from the auto repair shop system 504 in response to the transmission of an appointment request associated with a component recall. The transmission of the appointment request associated with the component recall is in response to the receipt of the component recall from the auto manufacturer system 502.

At 606, the vehicle 10 arrives at the auto repair shop 500. The vehicle maintenance manager 312 places the vehicle 10 in maintenance mode at 608. The vehicle maintenance manager 312 initiates an authentication process with the auto repair shop system 504 upon arrival. Upon successful authentication, the vehicle maintenance manager 312 is configured to place the vehicle 10 in the maintenance mode.

At 610, the vehicle maintenance manager 312 transmits the component model numbers and the component serial numbers of the vehicle components to the auto repair shop system 504. In various embodiments, the vehicle maintenance manager 312 transmits the component model numbers and the component serial numbers of the vehicle components involved in either the maintenance procedure or the component recall procedure to the auto repair shop system 504. When the vehicle 10 is placed in maintenance mode, with the exception of the component model numbers and the component serial numbers of the vehicle components installed in the vehicle 10 and stored in the manifest data database 304, all other information stored in the manifest data database 304 are accessible to the auto repair shop system 504 in a read only mode.

At 612, the vehicle maintenance manager 312 receives updated component model numbers and updated component serial numbers associated with the vehicle components that have been replaced at the auto repair shop 500 from the auto repair shop system 504. The vehicle maintenance manager 312 is configured to store the updated component model numbers and updated component serial numbers associated with the replaced vehicle components in the manifest data database 304.

At 614, the vehicle maintenance manager 312 transmits the updated component model numbers and updated component serial numbers associated with the replaced vehicle components to the auto manufacturer system 502. The auto manufacturer system 502 stores the updated component model numbers and updated component serial numbers for the replaced vehicle components in association with the vehicle 10 in the vehicle database 506. In instances where the vehicle components were replaced in response to a component recall, the auto manufacturer system 502 stores the updated component model numbers and updated component serial numbers for the replaced vehicle components in association with the vehicle 10 in the vehicle database 506 and stores an indication in the vehicle database 506 that the component recall has been addressed with respect to the vehicle 10. At 616, the vehicle maintenance manager 312 takes the vehicle 10 out of maintenance mode.

The use of a vehicle manifest data management system 100 in a vehicle 10 may enable accurate, secure, efficient, and effective communication with plant operation systems 202 and assembly stations 204 as well as equipment 208 and tool(s) 210 at the assembly stations 204. Vehicles 10 equipped with vehicle manifest data management system 100 can move to non-tethered manufacturing operations around a vehicle plant 200, collect vehicle components, and perform the vehicle assembly in a validated manner. Repair work on vehicles 10 equipped with vehicle manifest data management system 100 can be performed using the information stored in the vehicle manifest data management system 100 of the vehicle 10.

The vehicle manifest data management system 100 of the vehicle 10 stores the vehicle manifest data for the vehicle 10 enabling the vehicle manifest data management system 100 to communicate with the plant operation system 202 to facilitate the delivery of vehicle components to assembly stations 204 to implement on-time vehicle assembly processing. The stored vehicle manifest is used during the vehicle assembly process and is available for future use in connection with maintenance and/or component recall procedures. The ability of the vehicle manifest data management system 100 to establish direct communications with the equipment 208 and tool(s) 210 as an assembly station 204 enables the setting of vehicle specific tooling and equipment requirements. This may also allow for multiple architectures and styles to be built using common equipment 208 and tool(s) 210.

Communications between the vehicle manifest data management system 100 and the plant operation system 202 ensure step by step sequential scheduling including dispatching, routing, and time scheduling. Dispatching specifies the next vehicle component installation. Routing enables the selection of the optimal route to the assembly station 204 considering the traffic situation among several candidate routes that can connect a current location of the vehicle 10 to the assembly station 204 where the next vehicle component will be installed. Scheduling enables the calculation of the best arrival time at an assembly station 204 and accordingly specifying the vehicle speed enroute to the assembly station 204.

The use of the vehicle manifest data management system 100 also enables the efficient handling of contingency situations that may arise while the vehicle 10 is enroute from the current location to the assembly station 204. The disclosed methods of managing vehicle manifest data enables the implementation of secure communications with auto repair shops 500 and auto manufacturer systems 502 thereby guaranteeing the integrity of the data at both ends.

The use of the self-storage capability of the vehicle manifest data management system 100 to retain the vehicle manifest data enables the vehicle 10 to be a decentralized owner of its assembly data, trace data, vehicle component identification data and repair data for vehicle assembly processes, consumer information and service queries. The vehicle manifest data can be used to efficiently and precisely identify problematic vehicle components and facilitate the "fencing off" of the vehicles 10 with such vehicle components for component recalls. The vehicle manifest data stored in the vehicle manifest data management system 100 of a vehicle 10, including the vehicle components and vehicle assembly specifics can be provided to an auto repair shop 500 that can use an automatic diagnostic system to inspect the vehicle 10 and identify potential issues efficiently.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle manifest data management system of a vehicle comprising:
    at least one processor; and
    at least one memory communicatively coupled to the at least one processor, the at least one memory comprising instructions that upon execution by the at least one processor, cause the at least one processor to:

receive vehicle manifest data for the vehicle from a plant operation system of a vehicle plant, the vehicle manifest data comprising:
    a plurality of component identifiers, each of the plurality of component identifiers corresponding to one of a plurality of vehicle components for installation in the vehicle during a vehicle assembly process; and
    installation data associated with the installation of each of the plurality of vehicle components in the vehicle during the vehicle assembly process;
receive a first component identifier associated with a first vehicle component and a first assembly station identifier associated with a first assembly station equipped to install the first vehicle component from the plant operation system, the first component identifier being one of the plurality of component identifiers;
transmit the installation data associated with the first vehicle component to a station controller of the first assembly station, wherein the installation data associated with the first vehicle component comprises:
    first vehicle component tool settings for tools;
    first vehicle component equipment settings;
    first vehicle component installation instructions;
    first vehicle component fastener requirements;
    first vehicle component trace requirements;
    first vehicle component torque requirements; and
    fail-safe protocols associated with installation of the first vehicle component;
transmit a component delivery request to the plant operation system to deliver the first vehicle component to a component pick-up location at the vehicle plant;
issue instructions to an automated driving system (ADS) of the vehicle to drive the vehicle to the component pick-up location to enable loading of the first vehicle component into the vehicle;
issue instructions to the ADS to drive the vehicle from the component pick-up location to the first assembly station;
transmit a first appointment request associated with a maintenance procedure to an auto repair shop system;
receive a first appointment for the maintenance procedure from the auto repair shop system;
transmit a component model number and a component serial number associated with at least some of the vehicle components from the plurality of vehicle components associated with the maintenance procedure to the auto repair shop system;
receive an updated component model number and an updated component serial number associated with at least some replaced vehicle components from the auto repair shop system;
store the updated component model number and the updated component serial number in the at least one memory;
receive a component recall associated with the first vehicle component from an auto manufacturer system, the component recall being based on at least one of a component model number and a component serial number of the first vehicle component;
transmit a second appointment request associated with the component recall to an auto repair shop system; and receive a second appointment to implement a component recall procedure from the auto repair shop system.

2. The system of claim 1, wherein the at least one memory comprises further instructions that upon execution by the at least one processor, cause the at least one processor to:
receive at least one of the component model number and the component serial number associated with the first vehicle component from the station controller; and
store the received at least one of the component model number and the component serial number in the at least one memory.

3. The system of claim 1, wherein the at least one memory comprises further instructions that upon execution by the at least one processor, cause the at least one processor to receive the first component identifier associated with the first vehicle component from the plant operation system, wherein selection of the first vehicle component from the plurality of vehicle components by the plant operation system is based at least in part on an assembly order of the plurality of vehicle components.

4. The system of claim 1, wherein the at least one memory comprises further instructions that upon execution by the at least one processor, cause the at least one processor to receive the first assembly station identifier associated with the first assembly station from the plant operation system, wherein selection of the first assembly station from a plurality of assembly stations at a vehicle plant by the plant operation system is based at least in part on station availability data associated with each of the plurality of assembly stations.

5. The system of claim 1, wherein the at least one memory comprises further instructions that upon execution by the at least one processor, cause the at least one processor to:
receive a route to the first assembly station and a desired arrival time at the first assembly station from the plant operation system;
calculate a speed of the vehicle based on the route and the desired arrival time; and
issue instructions to an automatic driving system (ADS) of the vehicle to drive the vehicle to the first assembly station via the received route at the calculated vehicle speed.

6. The system of claim 1, wherein the at least one memory comprises further instructions that upon execution by the at least one processor, cause the at least one processor to transmit the component delivery request to the plant operation system to deliver the first vehicle component to the first assembly station.

7. A method for managing vehicle manifest data of a vehicle comprising:
receiving vehicle manifest data for the vehicle from a plant operation system of a vehicle plant at a vehicle manifest data management system of the vehicle, the vehicle manifest data comprising:
a plurality of component identifiers, each of the plurality of component identifiers corresponding to one of a plurality of vehicle components for installation in the vehicle during a vehicle assembly process; and
installation data associated with the installation of each of the plurality of vehicle components in the vehicle during the vehicle assembly process;
receiving a first component identifier associated with a first vehicle component and a first assembly station identifier associated with a first assembly station equipped to install the first vehicle component from the plant operation system at the vehicle manifest data management system, the first component identifier being one of the plurality of component identifiers; and
transmitting the installation data associated with the first vehicle component from the vehicle manifest data management system to a station controller of the first assembly station, wherein the installation data associated with the first vehicle component comprises:
first vehicle component tool settings;
first vehicle component equipment settings;
first vehicle component installation instructions;
first vehicle component fastener requirements;
first vehicle component trace requirements;
first vehicle component torque requirements; and
fail-safe protocols associated with installation of the first vehicle component;
transmitting a component delivery request to the plant operation system to deliver the first vehicle component to a component pick-up location at the vehicle plant;
issuing instructions to an automated driving system (ADS) of the vehicle to drive the vehicle to the component pick-up location to enable loading of the first vehicle component into the vehicle;
issuing instructions to the ADS to drive the vehicle from the component pick-up location to the first assembly station;
transmitting a first appointment request associated with a maintenance procedure to an auto repair shop system;
receiving a first appointment for the maintenance procedure from the auto repair shop system;
transmitting a component model number and a component serial number associated with at least some of the vehicle components from the plurality of vehicle components associated with the maintenance procedure to the auto repair shop system;
receiving an updated component model number and an updated component serial number associated with at least some replaced vehicle components from the auto repair shop system;
storing the updated component model number and the updated component serial number in the at least one memory;
receiving a component recall associated with the first vehicle component from an auto manufacturer system, the component recall being based on at least one of a component model number and a component serial number of the first vehicle component;
transmitting a second appointment request associated with the component recall to an auto repair shop system; and
receiving a second appointment to implement a component recall procedure from the auto repair shop system.

8. The method of claim 7, further comprising:
receiving at least one of the component model number and the component serial number associated with the first vehicle component from the station controller at the vehicle manifest data management system; and
storing the received at least one of the component model number and the component serial number at the vehicle manifest data management system.

9. The method of claim 7, further comprising:
receiving a route to the first assembly station and a desired arrival time at the first assembly station from the plant operation system at the vehicle manifest data management system;
calculating a speed of the vehicle based on the route and the desired arrival time at the vehicle manifest data management system; and issuing instructions from the vehicle manifest data management system to an automatic driving system (ADS) of the vehicle to drive the vehicle to the first assembly station via the received route at the calculated vehicle speed.

10. The method of claim 7, further comprising transmitting the component delivery request from the vehicle manifest data management system to the plant operation system to deliver the first vehicle component to the first assembly station.

11. A vehicle including a vehicle manifest data management system comprising:

at least one processor; and at least one memory communicatively coupled to the at least one processor, the at least one memory comprising instructions that upon execution by the at least one processor, cause the at least one processor to:

receive vehicle manifest data for the vehicle from a plant operation system, the vehicle manifest data comprising:

a plurality of component identifiers, each of the plurality of component identifiers corresponding to one of a plurality of vehicle components for installation in the vehicle during a vehicle assembly process; and installation data associated with the installation of each of the plurality of vehicle components in the vehicle during the vehicle assembly process;

receive a first component identifier associated with a first vehicle component and a first assembly station identifier associated with a first assembly station equipped to install the first vehicle component from the plant operation system, the first component identifier being one of the plurality of component identifiers; and transmit the installation data associated with the first vehicle component to a station controller of the first assembly station, wherein the installation data associated with the first vehicle component comprises:

first vehicle component tool settings;

first vehicle component equipment settings;

first vehicle component installation instructions;

first vehicle component fastener requirements;

first vehicle component trace requirements;

first vehicle component torque requirements; and fail-safe protocols associated with installation of the first vehicle component;

transmit a component delivery request to the plant operation system to deliver the first vehicle component to a component pick-up location at the vehicle plant;

issue instructions to an automated driving system (ADS) of the vehicle to drive the vehicle to the component pick-up location to enable loading of the first vehicle component into the vehicle;

issue instructions to the ADS to drive the vehicle from the component pick-up location to the first assembly station;

transmit a first appointment request associated with a maintenance procedure to an auto repair shop system;

receive a first appointment for the maintenance procedure from the auto repair shop system;

transmit a component model number and a component serial number associated with at least some of the vehicle components from the plurality of vehicle components associated with the maintenance procedure to the auto repair shop system;

receive an updated component model number and an updated component serial number associated with at least some replaced vehicle components from the auto repair shop system;

store the updated component model number and the updated component serial number in the at least one memory;

receive a component recall associated with the first vehicle component from an auto manufacturer system, the component recall being based on at least one of a component model number and a component serial number of the first vehicle component;

transmit a second appointment request associated with the component recall to an auto repair shop system; and receive a second appointment to implement a component recall procedure from the auto repair shop system.

12. The vehicle of claim 11, wherein the at least one memory comprises further instructions that upon execution by the at least one processor, cause the at least one processor to:

receive at least one of the component model number and the component serial number associated with the first vehicle component from the station controller; and store the received at least one of the component model number and the component serial number in the at least one memory.

13. The vehicle of claim 11, wherein the at least one memory comprises further instructions that upon execution by the at least one processor, cause the at least one processor to receive the first component identifier associated with the first vehicle component from the plant operation system, wherein selection of the first vehicle component from the plurality of vehicle components by the plant operation system is based at least in part on an assembly order of the plurality of vehicle components.

14. The vehicle of claim 11, wherein the at least one memory comprises further instructions that upon execution by the at least one processor, cause the at least one processor to receive the first assembly station identifier associated with the first assembly station from the plant operation system, wherein selection of the first assembly station from a plurality of assembly stations at a vehicle plant by the plant operation system is based at least in part on station availability data associated with each of the plurality of assembly stations.

15. The vehicle of claim 14, wherein the station availability data associated with the first assembly station comprises a length of a queue of vehicles awaiting installation of the first vehicle component at the first assembly station.

16. The vehicle of claim 15, wherein, the vehicle receives the station availability data associated with the first assembly station from another vehicle undergoing installation of the first vehicle component at the first assembly station.

17. The vehicle of claim 11, wherein the at least one memory comprises further instructions that upon execution by the at least one processor, cause the at least one processor to:

receive a route to the first assembly station and a desired arrival time at the first assembly station from the plant operation system;

calculate a speed of the vehicle based on the route and the desired arrival time; and issue instructions to an automatic driving system (ADS) of the vehicle to drive the vehicle to the first assembly station via the received route at the calculated vehicle speed.

18. The vehicle of claim 11, wherein the at least one memory comprises further instructions that upon execution by the at least one processor, cause the at least one processor to transmit the component delivery request to the plant operation system to deliver the first vehicle component to the first assembly station.

19. The system of claim 4, wherein the station availability data associated with the first assembly station comprises a length of a queue of vehicles awaiting installation of the first vehicle component at the first assembly station.

20. The system of claim 19, wherein, the vehicle receives the station availability data associated with the first assembly station from another vehicle undergoing installation of the first vehicle component at the first assembly station.

* * * * *